(12) United States Patent
Giancola et al.

(10) Patent No.: US 7,257,150 B2
(45) Date of Patent: Aug. 14, 2007

(54) RAKE RECEIVER AND A METHOD OF PROVIDING A FREQUENCY ERROR ESTIMATE

(75) Inventors: Diego Giancola, Cambridge (GB); Andrew Thurston, Cambridge (GB); Jonathan Lucas, Hertfordshire (GB)

(73) Assignee: Ubinetics Limited

( * ) Notice: Subject to any disclaimer, the term of this patent is extended or adjusted under 35 U.S.C. 154(b) by 779 days.

(21) Appl. No.: 10/432,318

(22) PCT Filed: Nov. 20, 2001

(86) PCT No.: PCT/GB01/05107

§ 371 (c)(1), (2), (4) Date: May 21, 2003

(87) PCT Pub. No.: WO02/43265

PCT Pub. Date: May 30, 2002

(65) Prior Publication Data

US 2004/0110461 A1 Jun. 10, 2004

(30) Foreign Application Priority Data

Nov. 21, 2000 (GB) ................................ 0028374.7

(51) Int. Cl.
*H04B 1/00* (2006.01)
*H04L 27/00* (2006.01)

(52) U.S. Cl. ..................... 375/147; 375/316

(58) Field of Classification Search .............. 375/316, 375/344, 362, 147
See application file for complete search history.

(56) References Cited

U.S. PATENT DOCUMENTS

| 5,555,247 | A | * | 9/1996 | Matsuoka et al. | 370/350 |
| 5,579,338 | A | | 11/1996 | Kojima | |
| 5,812,523 | A | * | 9/1998 | Isaksson et al. | 370/208 |
| 6,289,061 | B1 | * | 9/2001 | Kandala et al. | 375/344 |
| 6,421,401 | B1 | * | 7/2002 | Palin | 375/343 |
| 2002/0051486 | A1 | * | 5/2002 | Aue | 375/150 |

FOREIGN PATENT DOCUMENTS

DE 198 45 620 4/2000

(Continued)

OTHER PUBLICATIONS

Japanese Office Action for application No. 2002-544871, mailed Jun. 13, 2006, pp. 1-4 with English translation.

*Primary Examiner*—Chieh M. Fan
*Assistant Examiner*—Jason M. Perilla
(74) *Attorney, Agent, or Firm*—Kilpatrick Stpckton LLP

(57) ABSTRACT

An input signal is mixed with a scrambling code and with an OVSF code, and then accumulated over a period of time equal to one symbol of the pilot channel before being reset. The resultant complex signals are mixed with the conjugate of complex signals provided by a pilot pattern generator, with the result being fed to a delay line (22). A multiplier multiplies the complex value at a location P(n) in the delay line (22) by the conjugate of a complex value at another location P(n+k), and provides the resulting complex number (which is a complex vector whose phase is a coherent measurement of the phase rotation occurring between the symbols corresponding to the two locations) at an output (27). The real part of the complex signal provided at the output (27) is provided to a first combiner (30), and the imaginary part is provided to a second combiner (31). These combiners (30, 31) also receive corresponding signals from all of the other fingers (not shown) of the rake receiver. Each combiner (30, 31) coherently sums all of the signals at its inputs and provides the result to its respective accumulator (32, 33), which provide coherent filtering. The phase rotation of the combined and accumulated signals is then calculated. Once convergence of the frequency of an LO with the frequency of the received signals is achieved, the value of k is increased.

11 Claims, 2 Drawing Sheets

FOREIGN PATENT DOCUMENTS

Figure 1:
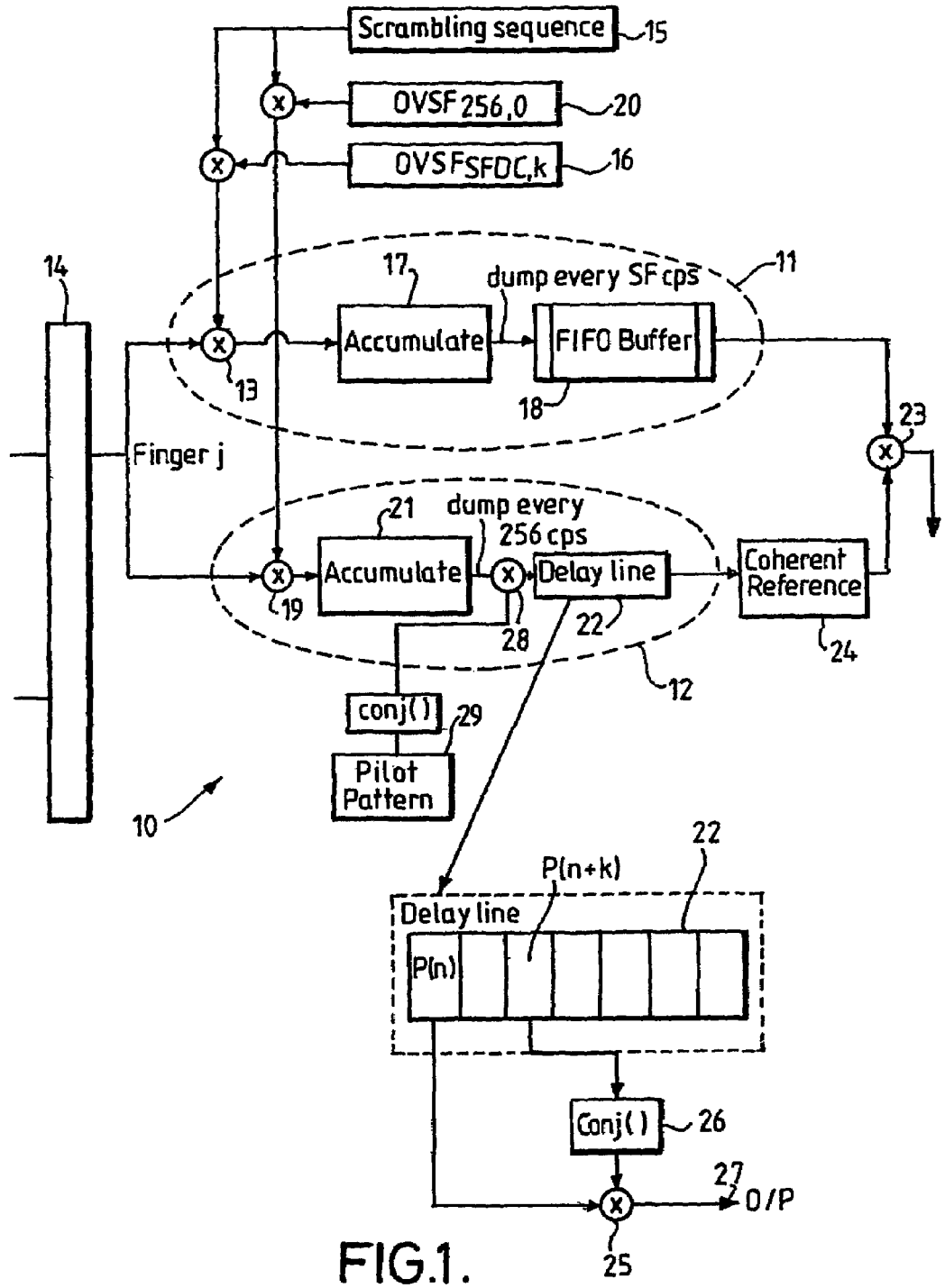

| | | |
|---|---|---|
| EP | 0675606 | 4/1995 |
| EP | 0 989 687 | 3/2000 |
| EP | 0989687 | 3/2000 |
| EP | 1336254 B1 | 7/2004 |
| GB | 2333422 A | 7/1999 |
| GB | 2364678 | 3/2001 |
| JP | H11-191896 | 7/1999 |
| JP | H11-266232 | 9/1999 |
| JP | 2000-049860 | 2/2000 |
| JP | 2001-016120 | 1/2001 |
| WO | WO 00/21209 A1 | 4/2000 |
| WO | WO 00/38343 | 6/2000 |

\* cited by examiner

RAKE RECEIVER AND A METHOD OF PROVIDING A FREQUENCY ERROR ESTIMATE

This invention relates to a method of providing an estimate of the difference in frequency between a carrier of a received signal and a locally-generated version of the carrier. This invention relates also to a rake receiver.

This invention has application in automatic frequency control subsystems in rake receivers.

In accordance with a first aspect of the invention, there is provided a method of providing an estimate of the difference in frequency between a carrier of a received signal and a locally-generated signal, the method comprising: in each of first and second fingers of a rake receiver: providing a first complex signal derived from a correlation of a received signal with the locally-generated signal over a first period of time; providing a second complex signal derived from a correlation of the received signal with the locally-generated signal over a second period of time, the second period of time being separated from the first period of time; and determining the product of the first signal and the conjugate of the second signal to provide a product signal; combining the product signals from the first and second fingers to provide a combined signal; using the combined signal to estimate the frequency error; and dynamically adjusting the spacing between the first and second periods of time on the basis of the estimated frequency error.

In accordance with a second aspect of the invention, there is provided a rake receiver, comprising: an oscillator, for locally-generating an oscillatory signal; an input, for receiving an input signal; and first and second fingers, each of the fingers having associated therewith: a first correlator, arranged to correlate the input signal with the oscillatory signal over first and second periods of time to provide, respectively, first and second complex signals; and a multiplier arranged to multiply the first complex signal with the conjugate of the second signal to provide a product signal; the rake receiver further comprising: a sequencer arranged to cause the first period of time to be separated from the second period of time; a combiner arranged to combine the product signals from the first and second fingers to produce a combined signal; and an estimator arranged to estimate a frequency error of the oscillator on the basis of the combined signal, the sequencer being arranged to adjust dynamically the separation of the first and second periods of time on the basis of the estimated frequency error.

The invention allows exploitation of the diversity offered by the propagation channel between a transmitter and the rake receiver. The invention provides some immunity also to impulsive noise caused by phase step changes during fades.

Figure 2:
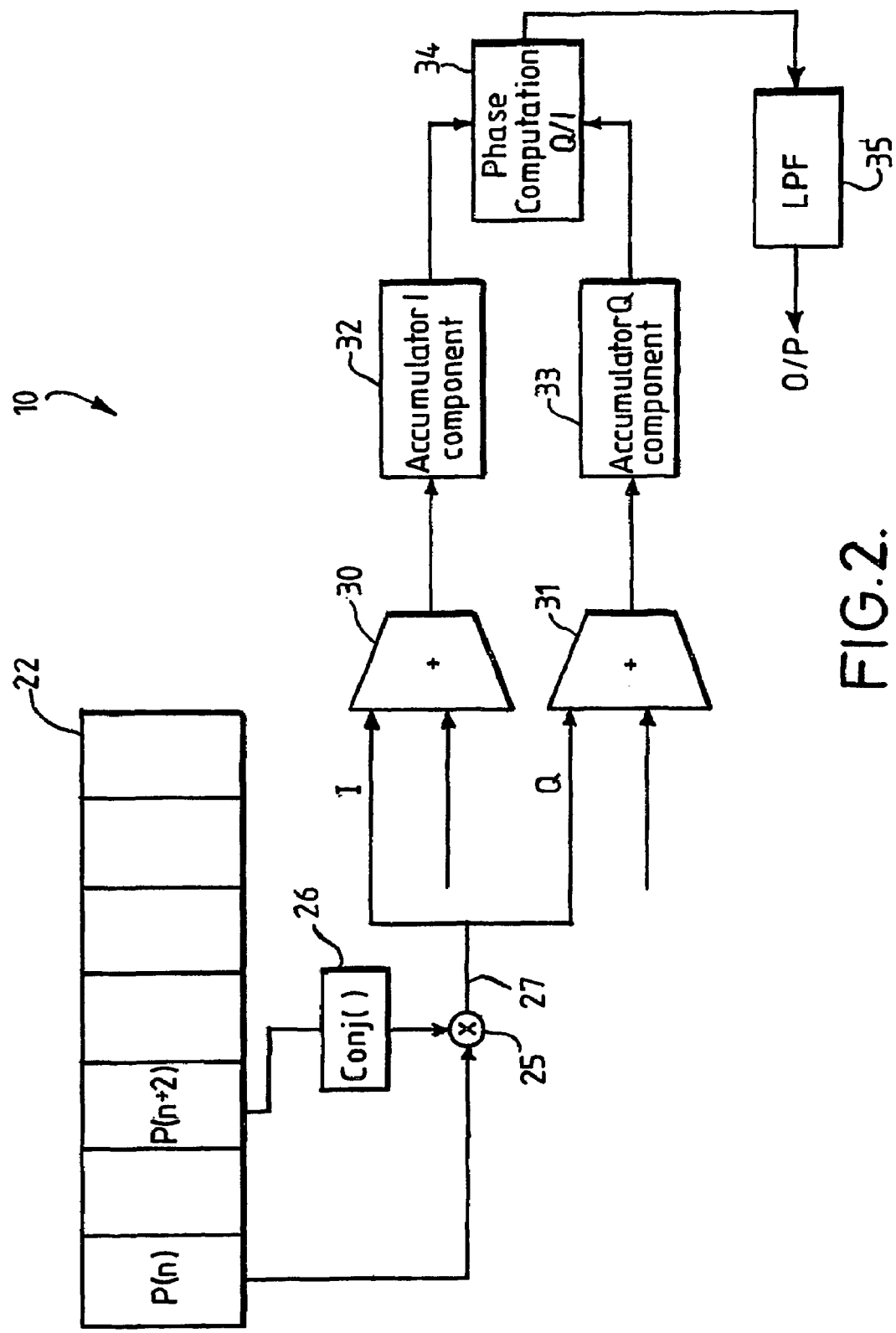

An embodiment of the invention will now be described with reference to the accompanying drawings, of which:

FIGS. 1 and 2 show schematically parts of a rake receiver implementing the invention.

A finger 10 of a rake receiver to which the invention is applied is shown in FIG. 1. Referring to FIG. 1, the finger 10 comprises generally circuitry forming a traffic channel 11 and circuitry forming a pilot channel 12. A mixer 13 in the traffic channel circuitry 11 mixes an input signal, received from a schematic delay line 14, with a code provided by a scrambling code generator 15 and with a traffic channel specific code provided by a first OVSF code generator 16. The resultant signal is fed to a first accumulator 17 and to a first-in-first-out (FIFO) buffer 18, in a conventional manner. In the pilot channel circuitry 12, the input signal is mixed, in a second mixer 19, with the code provided by the scrambling code generator 15 and with a pilot channel specific code, generated by a second OVSF code generator 20. This mixed signal is then accumulated in a second accumulator 21 over a period of time equal to one symbol of the pilot channel before being reset. The reset period of the second accumulator 21 is aligned with reset period of the OVSF code provided by the first OVSF code generator 16. The resultant complex signals are mixed in a pilot mixer 28 with the conjugate of complex signals provided by a pilot pattern generator. The resultant pilot pattern mixed complex signals are fed to a second delay line 22 and, from there, to a complex multiplier 23 via a coherent phase reference device 24. The complex multiplier 23 multiplies the output signals from the traffic channel 11 and the pilot channel 12, the result being provided to a coherent combiner (not shown) along with signals from other fingers (not shown) of the rake receiver.

The code generators 15, 16 and 20 are symbol locked with each other. The code generator 15 runs at chip rate, the code generator 16 runs at traffic channel symbol rate and the code generator 20 runs at pilot channel symbol rate.

The complex value at a location P(n) in the second delay line 22 is provided to a first input of a multiplier 25. The conjugate of a complex value at another location P(n+k) in the second delay line 22 is calculated by a conjugate calculation device 26, and the result provided to a second input of the multiplier 25. The multiplier 25 multiplies the two complex numbers it receives, and provides the resulting complex number at an output 27. Initially, the value of k is set to 2, the location P(n) then corresponding to an accumulation result two symbols subsequent to the location P(n+2). The second delay line 22 operates in a rolling manner such that, when another accumulation result is provided by the second accumulator 21, this is fed through the second delay line, and the multiplier 25 is then fed with signals from subsequent locations in the second delay line. A new complex number output is, therefore, provided every symbol.

The complex number output is a complex vector whose phase is a coherent measurement of the phase rotation occurring between the symbols corresponding to the locations P(n) and P(n+k). The magnitude of the complex vector is proportional to the average power of the accumulation results from those two symbols.

FIG. 2 shows a further part of the finger 10 of the rake receiver, with reference numerals retained from FIG. 1 for like elements. The finger 10 further comprises first and second combiners 30, 31, which feed a respective one of second and third accumulators 32, 33, a phase computation device 34 and a low-pass filter 35.

The real part of the complex signal provided at the output 27 of the complex multiplier 25 is provided to a first input of the first combiner 30. The imaginary part of the same signal is similarly provided to a first input of the second combiner 31. These combiners 30, 31 also receive corresponding signals from all of the other fingers (not shown) of the rake receiver. Each combiner 30, 31 coherently sums all of the signals at its inputs and provides the result to its respective accumulator 32, 33, which provide coherent filtering. The phase rotation of the combined and accumulated signals is then calculated by the phase computation device 34, which operates in a conventional manner, taking into account the time separation of the locations P(n) and P(n+k). Since the magnitudes of the complex signals are related to the strengths of the signals from which they are derived, this arrangement gives weight to the contributions that the fingers make according to the power of the signal that they receive. The angle of phase rotation calculated by the phase calculation device 34 is filtered by the low pass filter 35 prior to being fed back to control the operating frequency of the receiver's local oscillator (not shown) to tend towards that of the received carrier.

Once convergence is reached, the value of k is increased, so that the multiplier 25 receives signals which correspond to accumulation results spaced further apart in time, for example six symbols apart. This allows more accurate phase, and therefore frequency, error signals to be calculated. This has the advantage of allowing for a finer resolution in frequency error measurements.

This invention is also used in providing a frequency error estimate from signals associated with different base stations in a soft handover scenario. The different fingers within the rake receiver despread incoming signals transmitted from different base station transmitters. Since different base stations have different scrambling codes, different fingers are provided with different OVSF and scrambling codes. In this case, first and second fingers each include a respective code generator arranged to generate a code different to the code generated by the other code generator, i.e. one code corresponds to the pilot channel code from one base station and the other code corresponds to the pilot channel code from another base station. The resulting frequency error estimate is the difference between the local frequency reference (the local oscillator) and the average frequency of the carriers of the base stations transmitters involved in soft handover. Signals contributing to the frequency error estimate are weighted according to their signal strengths.

Although the combining of signals from only two fingers is described, it is expected that the invention will be used to combine signals from all or most of the fingers of a rake receiver, which may be six or eight fingers for a UMTS radiotelephone rake receiver for example.

The invention may be implemented in software, in an application specific integrated circuit (ASIC) or in a field programmable gate array (FPGA), for example.

The invention claimed is:

1. A method of providing an estimate of the difference in frequency between a carrier of a received signal and a locally-generated signal, the method comprising:
   in each of first and second fingers of a rake receiver:
   providing a first complex signal derived from a correlation of a received signal with the locally-generated signal over a first period of time;
   providing a second complex signal derived from a correlation of the received signal with the locally-generated signal over a second period of time, the second period of time being separated from the first period of time; and
   determining the product of the first complex signal and the conjugate of the second complex signal to provide a product signal;
   combining the product signals from the first and second fingers to provide a combined signal;
   using the combined signal to estimate a frequency error; and
   dynamically adjusting the separation between the first and second periods of time on the basis of the estimated frequency error.

2. A method according to claim 1, further comprising comparing the estimated frequency error to a threshold, and controlling an operating mode of the rake receiver on the basis of the comparison.

3. A method according to claim 1, further comprising low-pass filtering successive frequency error estimates to provide a filtered signal, and controlling the operating frequency of an oscillator providing the locally-generated signal on the basis of the filtered signal.

4. A method according to claim 2, further comprising low-pass filtering successive frequency error estimates to provide a filtered signal, and controlling the operating frequency of an oscillator providing the locally-generated signal on the basis of the filtered signal.

5. A rake receiver, comprising:
   an oscillator, for locally-generating an oscillatory signal;
   an input, for receiving an input signal; and
   first and second fingers, each of the fingers having associated therewith:
   a first correlator, arranged to correlate the input signal with the oscillatory signal over first and second periods of time to provide, respectively, first and second complex signals; and
   a multiplier arranged to multiply the first complex signal with the conjugate of the second complex signal to provide a product signal;
   the rake receiver further comprising:
   a sequencer arranged to cause the first period of time to be separated from the second period of time;
   a combiner arranged to combine the product signals from the first and second fingers to produce a combined signal; and
   an estimator arranged to estimate a frequency error of the oscillator on the basis of the combined signal,
   the sequencer being arranged to adjust dynamically the separation between the first and second periods of time on the basis of the estimated frequency error.

6. A rake receiver according to claim 5, further comprising a comparator, the comparator being arranged to compare the estimated frequency error to a threshold; and a controller arranged to control an operating mode of the rake receiver on the basis of the comparison result.

7. A rake receiver according to claim 5, further comprising a low-pass filter arranged to filter successive frequency error estimations, and to provide the resulting filtered signal to a frequency control input of the oscillator.

8. A rake receiver according to claim 5, in which the first and second fingers each include a respective code generator arranged to generate a unique code with respect to the other code generator.

9. A rake receiver according to claim 6, further comprising a low-pass filter arranged to filter successive frequency error estimations, and to provide the resulting filtered signal to a frequency control input of the oscillator.

10. A rake receiver according to claim 6, in which the first and second fingers each include a respective code generator arranged to generate a unique code with respect to the other code generator.

11. A rake receiver according to claim 7, in which the first and second fingers each include a respective code generator arranged to generate a unique code with respect to the other code generator.

* * * * *